US008171916B2

(12) United States Patent
Nishibu et al.

(10) Patent No.: US 8,171,916 B2
(45) Date of Patent: May 8, 2012

(54) FUEL SUPPLY SYSTEMS

(75) Inventors: Hideaki Nishibu, Tokai (JP); Toshio Nishio, Handa (JP); Yoko Iwao, Toyota (JP)

(73) Assignee: Aisan Kogyo Kabushiki Kaisha, Aichi-Ken (JP)

( * ) Notice: Subject to any disclaimer, the term of this patent is extended or adjusted under 35 U.S.C. 154(b) by 509 days.

(21) Appl. No.: 12/538,360

(22) Filed: Aug. 10, 2009

(65) Prior Publication Data

US 2010/0043755 A1 Feb. 25, 2010

(30) Foreign Application Priority Data

Aug. 21, 2008 (JP) ................................ 2008-212771

(51) Int. Cl.
*F02M 59/36* (2006.01)
*F16K 31/12* (2006.01)

(52) U.S. Cl. .................... 123/458; 137/510; 137/505.14

(58) Field of Classification Search .......... 123/457–465; 137/494, 509, 510, 505, 505.12, 505.14
See application file for complete search history.

(56) References Cited

U.S. PATENT DOCUMENTS 4,274,380 A * 6/1981 de Vulpillieres .............. 123/456
4,522,177 A * 6/1985 Kawai et al. .................. 123/478
4,872,437 A * 10/1989 Asayama ...................... 123/463
5,367,999 A * 11/1994 King et al. .................... 123/458
5,381,816 A * 1/1995 Alsobrooks et al. ....... 137/15.22
5,398,655 A * 3/1995 Tuckey ......................... 123/456
5,560,340 A * 10/1996 Tomisawa ..................... 123/494
5,673,670 A * 10/1997 Powell et al. ................ 123/463
5,967,119 A * 10/1999 Burkhard et al. ............. 123/458
7,458,362 B2 * 12/2008 Hazama et al. ............... 123/457
7,717,091 B2 * 5/2010 Aoki et al. .................... 123/511
7,740,006 B2 * 6/2010 Ikeya ............................ 123/506
7,878,179 B2 * 2/2011 Ikeya ............................ 123/457
7,971,574 B2 * 7/2011 Kondoh ........................ 123/457

FOREIGN PATENT DOCUMENTS

JP 2001090624 4/2001
JP 2008038689 2/2008

* cited by examiner

*Primary Examiner* — Thomas Moulis

(74) *Attorney, Agent, or Firm* — Dennison, Schultz & MacDonald

(57) ABSTRACT

A fuel supply system includes a fuel pump for supplying fuel in a fuel tank to an engine, a pressure regulator and a three-way valve disposed in a valve chamber. The pressure regulator includes a pressure regulating chamber and a control pressure chamber and adjusts a fuel pressure in the pressure regulating chamber depending on a fuel pressure in the control pressure chamber. A control pressure passage for flowing the fuel to the control pressure chamber and the valve chamber is formed in a unit case.

6 Claims, 11 Drawing Sheets

FUEL SUPPLY SYSTEMS

This application claims priority to Japanese patent application serial number 2008-212771, the contents of which are incorporated herein by reference.

BACKGROUND OF THE INVENTION

The present invention relates to fuel supply systems mainly used for engines of vehicles.

A known fuel supply system will be described. FIG. 14 is a schematic structural view showing the known fuel supply system.

As shown in FIG. 14, in a fuel supply system 200, fuel in a fuel tank 201 is suctioned and pressurized due to a fuel pump 202, and then is transported through a feeding pipe 203 and is injected from each of injection valves 205 toward a combustion chamber of an internal combustion engine (hereafter called "engine"). A reflux control valve 224 (also called "on-off valve") is opened and closed depending on control signals from a control unit 229 such that pressure of the fuel (hereafter called "fuel pressure") supplied to the injection valves 205 can be switched between two levels, i.e., high pressure level and low pressure level. That is, when the reflux control valve 224 is opened during, for example, engine starting, the fuel is introduced into a control pressure chamber 208B of a pressure regulator 208, and fuel pressure in the control pressure chamber 208B increases. With this, fuel pressure in a pressure regulating chamber 208A of the pressure regulator 208 is increased, and fuel pressure in the feeding pipe 203 communicating with the pressure regulating chamber 208A is increased. This makes the pressure of fuel supplied to each injection valves 205 increase, so that atomization of injected fuel is enhanced, and startability of the engine is improved. In addition, when the reflux control valve 224 is closed after engine starting, introduction of fuel into the control pressure chamber 208B of the pressure regulator 208 is inhibited, and the fuel pressure in the control pressure chamber 208B decreases. With this, the fuel pressure in the pressure regulating chamber 208A is decreased, and the fuel pressure in the feeding pipe 203 is decreased. This makes the pressure of the fuel supplied to the each injection valve 205 decrease, so that a load, for example, on the fuel pump 202 can be reduced. The known fuel supply system is disclosed in, for example, Japanese Laid-Open Patent Publication No. 2001-90624.

In the known fuel supply system 200 (refer to FIG. 14), a fuel induction pipe 206 branched from the feeding pipe 203 is connected to the pressure regulating chamber 208A of the pressure regulator 208, and an upstream induction pipe 222A branched from the fuel induction pipe 206 is connected to the reflux control valve 224 (in particular, valve chamber). The reflux control valve 224 (in particular, valve chamber) is connected with the control pressure chamber 208B of the pressure regulator 208 via a downstream induction pipe 222B. The upstream induction pipe 222A and the downstream induction pipe 222B form a fuel passage for control pressure (hereafter called fuel passage) to the control pressure chamber 208B of the pressure regulator 208 and the reflux control valve 224, and are composed of piping members such as hose or pipe. Accordingly, the number of piping members used for the fuel passage and the number of assembly steps must be increased, resulting complicating the piping work. In addition, complex piping arrangement causes decrease of assembly property of the pressure regulator 208 and the reflux control valve 224 and decrease of sealing performance depending on the assembly property.

Thus, there is a need in the art for an improved fuel supply system.

SUMMARY OF THE INVENTION

One aspect according to a fuel supply system of the present invention includes a fuel pump for supplying fuel in a fuel tank to an engine, a pressure regulator and a three-way valve disposed in a valve chamber. The pressure regulator includes a pressure regulating chamber and a control pressure chamber and adjusts fuel pressure in the pressure regulating chamber depending on fuel pressure in the control pressure chamber. A control pressure passage for flowing the fuel to the control pressure chamber and the valve chamber is defined in a unit case.

DETAILED DESCRIPTION OF THE INVENTION

Figure 1:
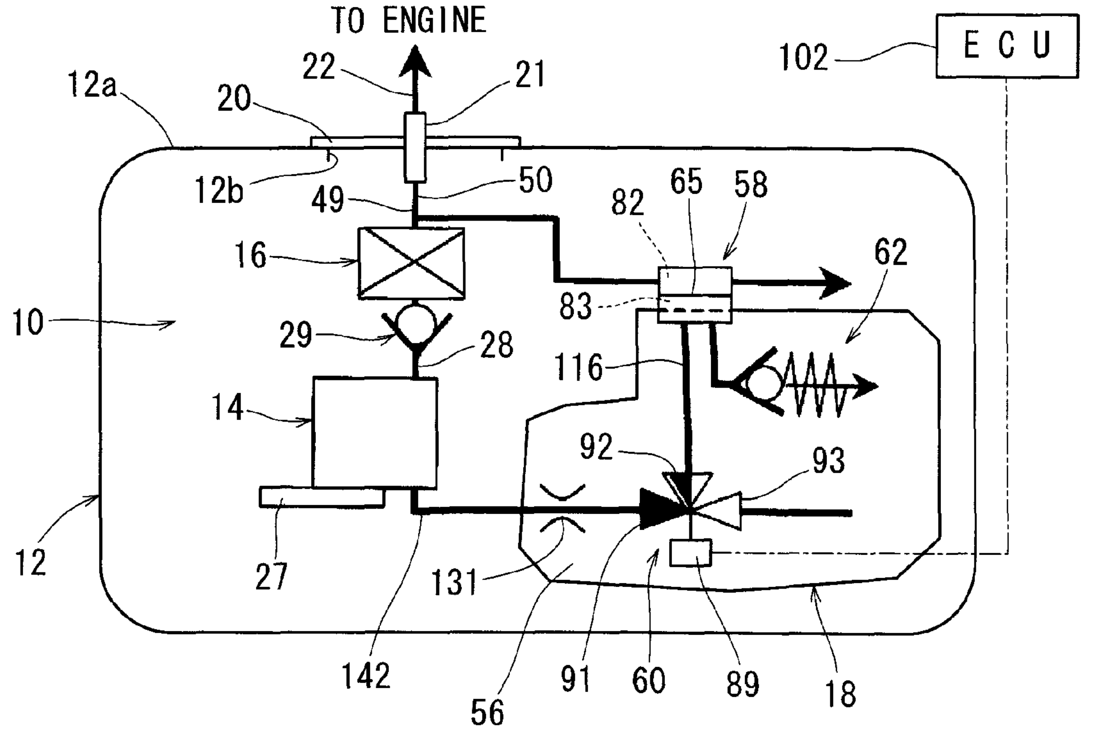
FIG. 1 is a schematic structural view showing a fuel supply system according to one aspect of the invention.

Each of the additional features and teachings disclosed above and below may be utilized separately or in conjunction with other features and teachings to provide improved fuel supply systems. Representative examples of the present invention, which examples utilized many of these additional features and teachings both separately and in conjunction with one another, will now be described in detail with reference to the attached drawings. This detailed description is merely intended to teach a person of skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

One embodiment of a fuel supply system according to the present invention includes a fuel tank for storing fuel, a fuel pump, a pressure regulator, a control device, a changeover valve and a passage forming member. The fuel pump supplies the fuel in the tank to an engine. The pressure regulator has a pressure regulating chamber and a control pressure chamber divided by a movable partition, adjusts a fuel pressure in the pressure regulation chamber depending on pressure in the control pressure chamber, and discharges redundant fuel in the pressure regulation chamber. The fuel introduced into the pressure regulation chamber is the pressurized fuel after pressurization due to the fuel pump, whereas the fuel introduced into the control pressure chamber is the fuel after pressurization or being pressurized due to the fuel pump. The changeover valve is disposed in a valve chamber and selectively switches between an introduction of fuel and an introduction of air to the control pressure chamber of the pressure regulator depending on control by the control device. The passage forming member forms a control pressure passage for feeding the fuel to the control pressure chamber of the pressure regulator and the valve chamber for the changeover valve.

According to the above fuel supply system, the fuel in the fuel tank is suctioned and pressurized due to the fuel pump, and then is adjusted to a predetermined fuel pressure by the pressure regulator and is supplied to the engine. In addition, the changeover valve is controlled by the control device, and it is selectively switched between the induction of fuel and the induction of air to the control pressure chamber of the pressure regulator in order to change fuel pressure supplied to the engine.

Here, the control pressure passage for flowing the fuel to the control pressure chamber of the pressure regulator and the valve chamber of the changeover valve is formed in the passage forming member. Therefore, it is able to reduce the number of parts and the number of assembly steps as for piping members such as hose and pipe used for the fuel passage connected to control pressure chamber of the pressure regulator and the changeover valve.

According to another embodiment, the passage forming member supports a portion of the pressure regulator, which includes the control pressure chamber. Therefore, the passage forming member can work as a support member for the portion of the pressure regulator.

According to another embodiment, the pressure regulator and the changeover valve are assembled to the passage forming member from the same direction. Therefore, it is able to improve assembly property of the pressure regulator and the changeover valve to the passage forming member.

According to another embodiment, a relief valve controlling the fuel pressure in the control pressure chamber of the pressure regulator to a predetermined pressure is provided in the control pressure passage of the passage forming member. Therefore, it is able to control the fuel pressure in the control pressure chamber of the pressure regulator at the predetermined pressure due to the relief valve. In addition, the relief valve is disposed in the control pressure passage of the passage forming member, so that it is able to omit some piping members such as hose or pipe forming the fuel passage for the relief valve and to simplify a piping arrangement as for the fuel passage.

According to another embodiment, the changeover valve, the pressure regulator and the relief valve are sequentially disposed in the control pressure passage from an upstream side to a downstream side. Therefore, the fuel flowing in the control pressure passage of the passage forming member sequentially passes through the changeover valve, the pressure regulator and the relief valve, and then flows out of control pressure passage. Thus, it is able to prevent or reduce accumulation of the fuel in the control pressure passage.

According to the other embodiment, at least two of the pressure regulator, the changeover valve and the relief valve are assembled to the passage forming member from the same direction. Therefore, it is able to improve assembly property of at least two of the pressure regulator, the changeover valve and the relief valve to the passage forming member.

Aspects of the invention will be described in reference to the drawings.

Figure 2:
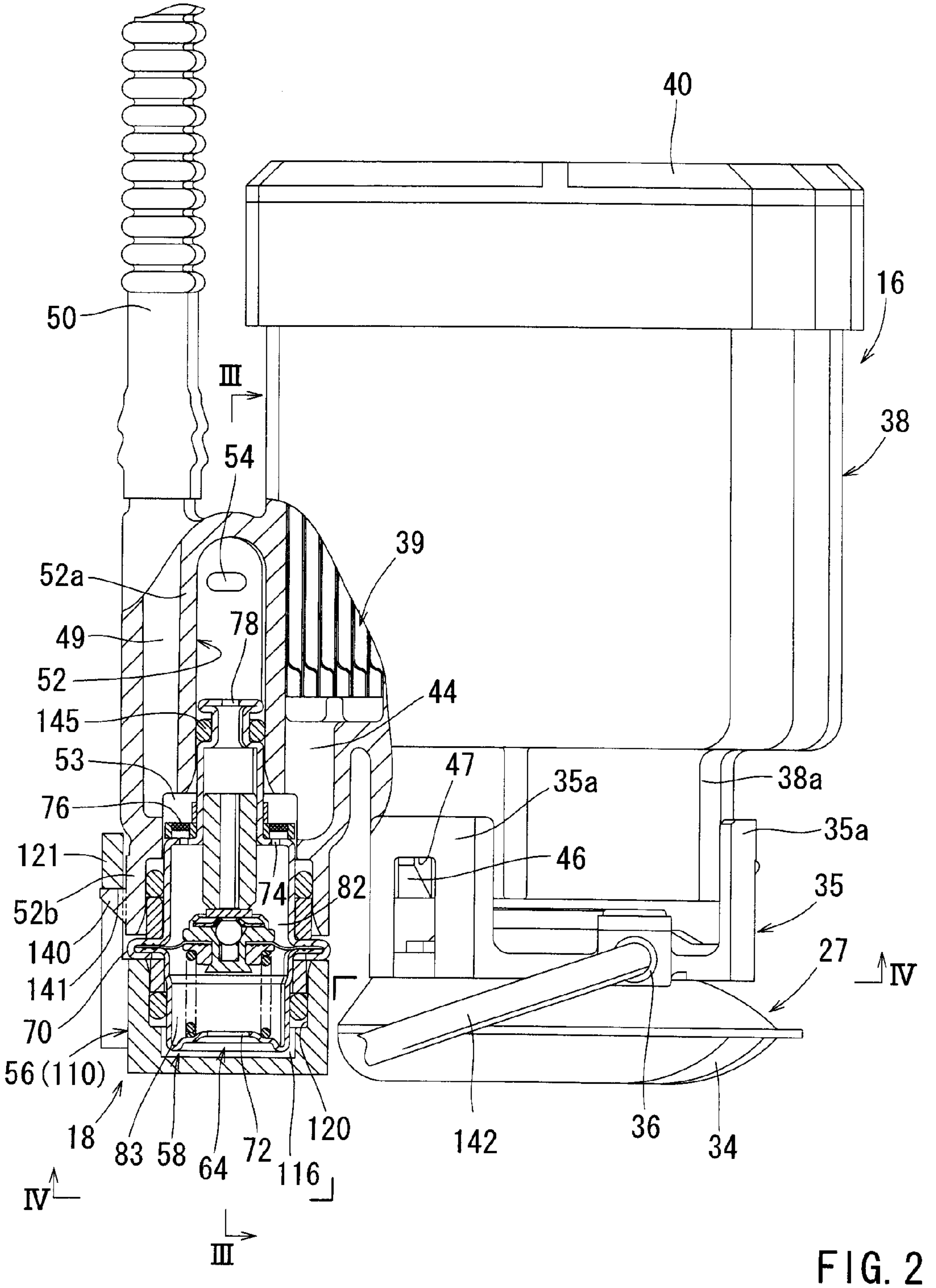
FIG. 2 is a partially sectional front view of the fuel supply system.
Figure 3:
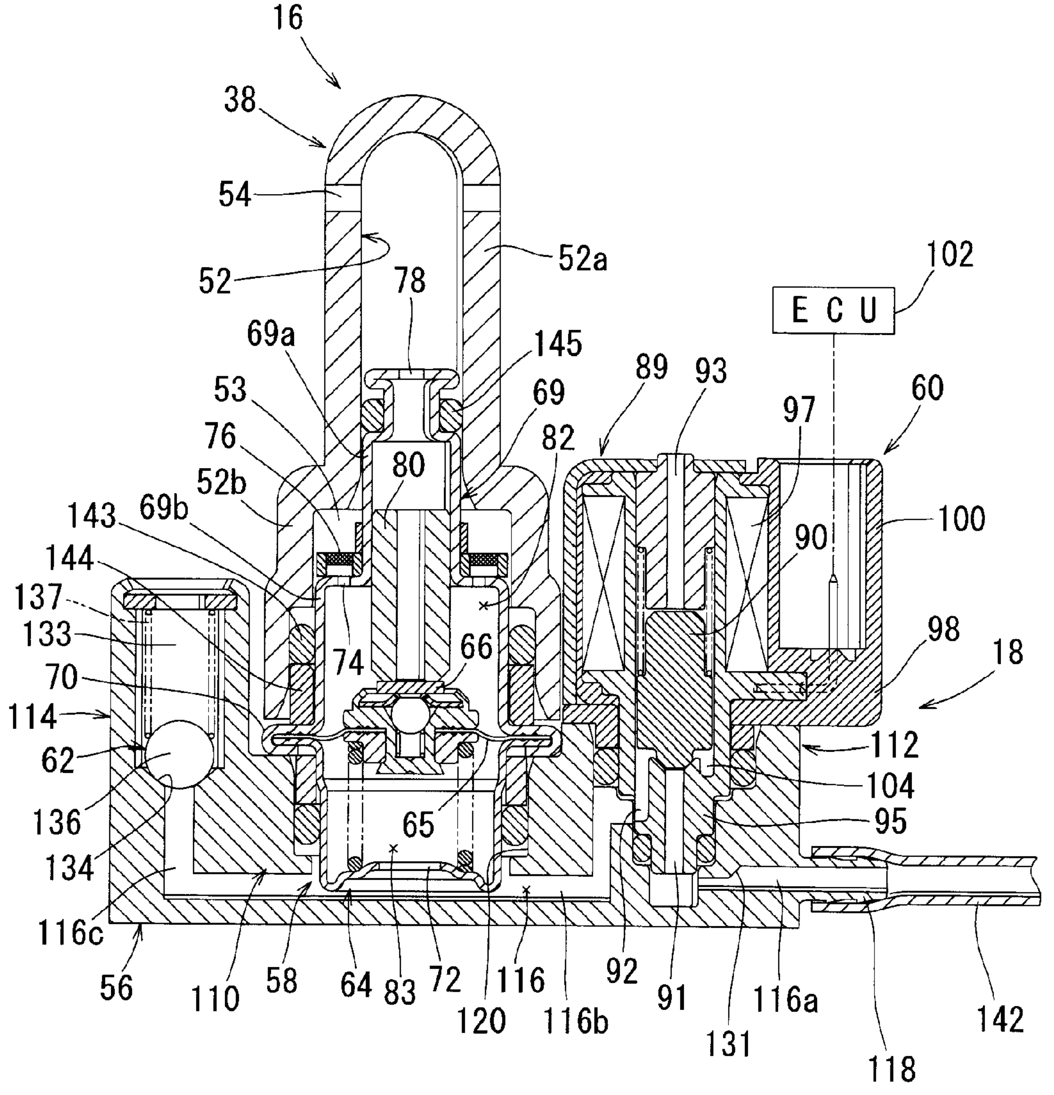
FIG. 3 is a cross-sectional view along line III-III in FIG. 2.
Figure 4:
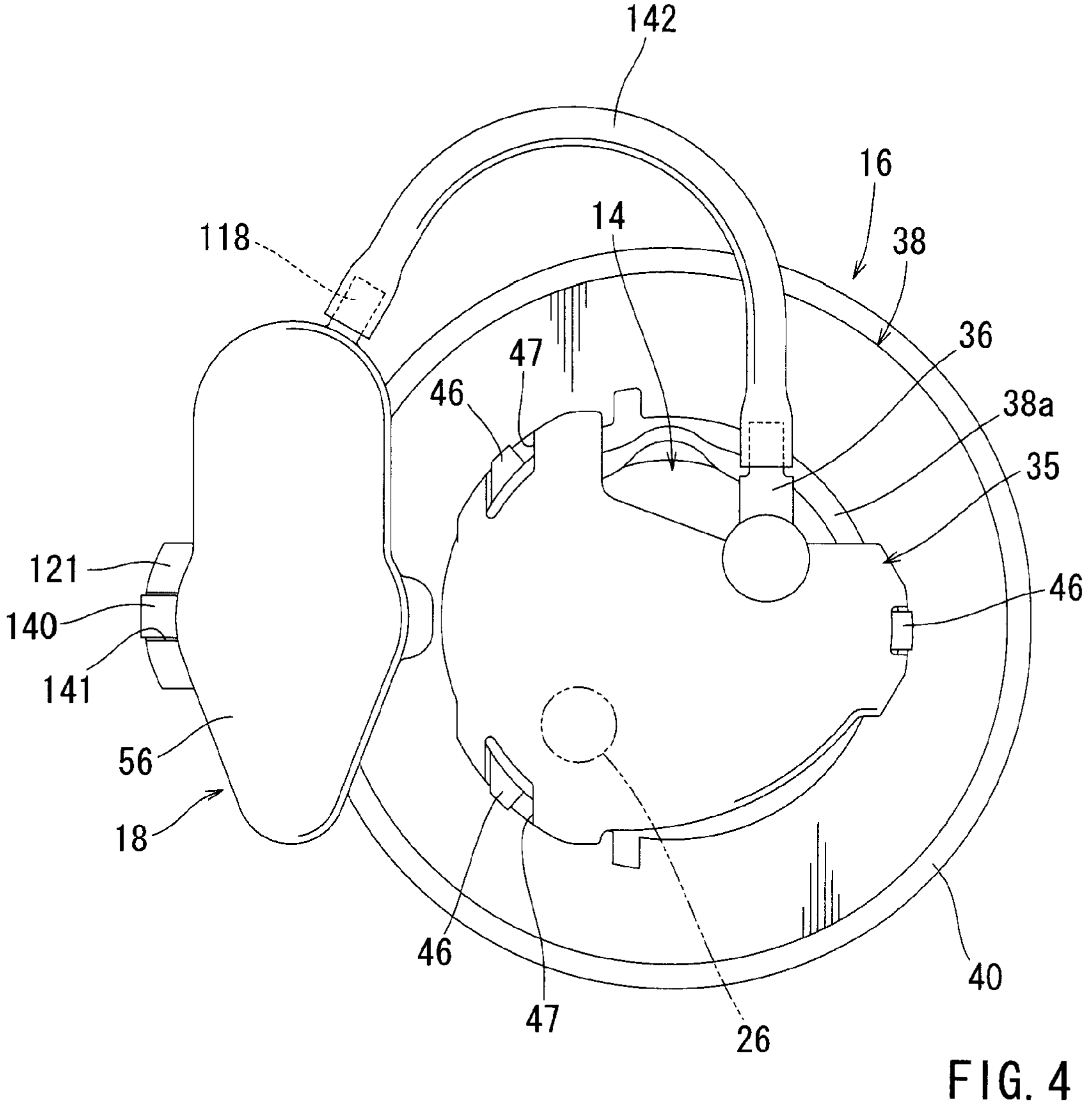
FIG. 4 is a cross-sectional view along line IV-IV in FIG. 2.

FIG. 1 is a schematic structural view showing a fuel supply system. FIG. 2 is a partially sectional front view. FIG. 3 is a cross-sectional view along line III-III in FIG. 2. FIG. 4 is a cross-sectional view along line IV-IV in FIG. 2.

As shown in FIG. 1, a fuel supply system 10, that can be mounted on a vehicle, supplies fuel (in a fuel tank 12) to an engine (in particular, an injector). The fuel supply system 10 has a fuel pump 14 disposed in the fuel tank 12, a fuel filter 16 and a control pressure regulation unit 18. An opening 12*b* formed in an upper plate 12*a* of the fuel tank 12 is closed with a set plate 20. The set plate 20 is provided with a fuel feeding pipe 21 communicating inside and outside of the fuel tank 12. In addition, a fuel feeding passage 22 communicating with the engine (in particular, the injector) is connected with the fuel feeding pipe 21 outside the fuel tank 12.

Figure 5:
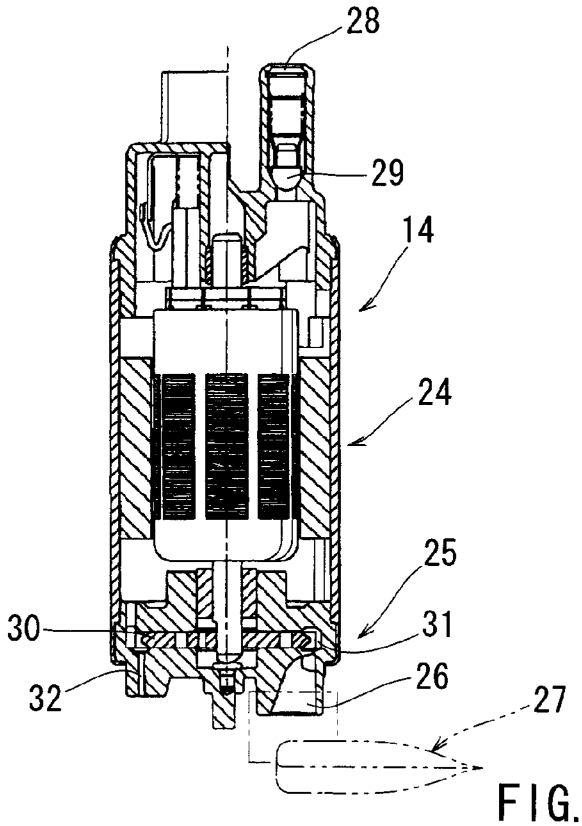
FIG. 5 is a cross-sectional view of a fuel pump.

FIG. 5 is a cross-sectional view of fuel pump 14, which can be In-tank fuel pump integrated with a motor, including an electric motor 24 and an impeller pump 25 attached to a lower end of the motor 24. A fuel intake opening 26 for suctioning the fuel in the fuel tank 12 is formed at a lower side of the pump 25. The fuel intake opening 26 is connected with a suction filter 27 for filtering the fuel suctioned from the fuel tank 12 (refer to FIG. 1) into the fuel pump 14. A fuel discharge opening 28 for discharging the fuel in the motor 24 is provided at an upper surface of the motor 24. In addition, a check valve 29 preventing backflow of the fuel is provided in the fuel discharge opening 28 of the fuel pump 14.

In the fuel pump 14, when an impeller 30 of the pump 25 is rotated due to operation of the motor 24, the fuel in the fuel tank 12 is suctioned and pressurized, and then is discharged into the motor 24. The fuel discharged from the pump 25 into the motor 24 cools the inside of the motor 24, lubricates and cleans a rotating portion in the motor during flowing upward in the motor 24, and then is discharged from the fuel discharge opening 28. A vapor jet 32 for discharging vapor (bubble caused by vaporization of the fuel), which is included in the fuel during pressurization, from a pump passage 31 is mounted on a lower side of the pump 25. In addition, the vapor jet 32 corresponds to "vapor fuel discharge opening discharging the fuel including vapor (called "vapor fuel")" herein.

As shown in FIG. 2, the suction filter 27 has a filter member 34 formed in a bag shape and an attachment 35 mounted on an upper surface of the filter material 34. The attachment 35 is fitted with the lower surface of the pump 25 such that an inner space of the filter member 34 communicates with the fuel intake opening 26. The attachment 35 is provided with a hose connecting port 36 communicating with the vapor jet 32 of the fuel pump (refer to FIG. 5) and protruding forward (refer to FIG. 4). Here, the attachment 35 is adapted to be attached to a lower side of a filter case 38 (described later).

As shown in FIG. 2, the fuel filter 16 has the filter case 38 and a cylindrical tubular filter element 39 dividing an inner space of the case 38 into two chambers. An upper opening of the filter case 38 is closed with a filter cover 40. The filter case 38 has a fuel inlet (not shown) communicating with one chamber and a fuel outlet 44 communicating with the other chamber (refer to FIG. 2). The fuel pump 14 is supported such that the pump 14 passes through a central region of the filter case 38 (refer to FIG. 4). In addition, the fuel inlet of the filter case 38 communicates with the fuel discharge opening 28 of the fuel pump 14 (refer to FIG. 5).

The attachment 35 of the suction filter 27 is attached to the lower surface of the filter case 38, due to (for example) snap fitting. With respect to such snap fitting, at least one engaging projection 46, which is formed on an outer surface of a cylindrical tubular portion 38*a* protruding downwardly from a lower surface of the filter case 38, and at least one engaging hole 47, which is formed in attaching pieces 35*a* (two pieces are shown in FIG. 2) of the attachment 35 engaging with the outer cylindrical surface of the filter case 38, engage with each other due to elastic deformation of the attaching piece 35*a*.

As shown in FIG. 2, a fuel discharge passage 49 communicating with the filter case 38 and extending upwardly is formed at a lower right portion of the filter case 38. An upper end of the fuel discharge passage 49 and a lower end of the fuel feeding pipe 21 of the set plate 20 communicate with each other via a piping member 50 in the fuel tank 12 (refer to FIG. 1).

Figure 6:
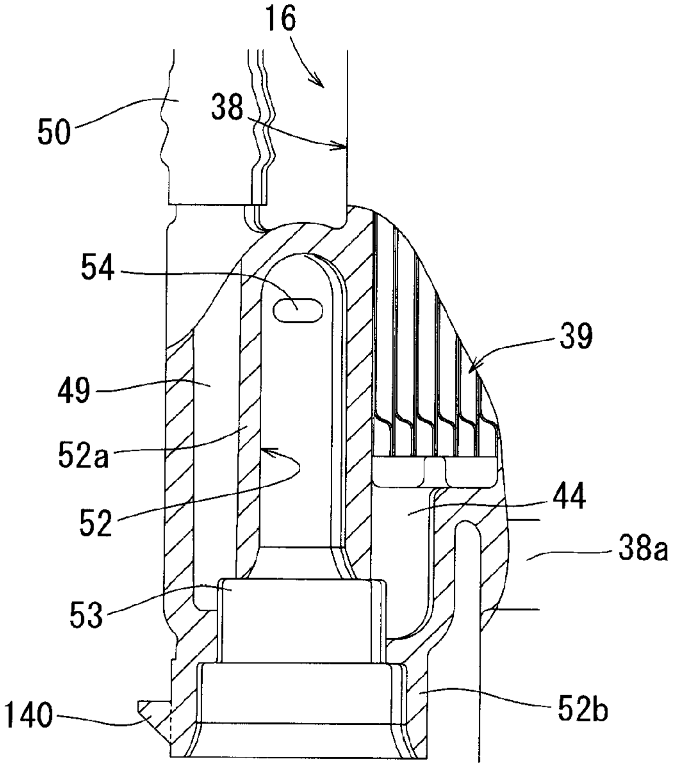
FIG. 6 is a cross-sectional view showing a part of a filter case.

FIG. 6 is a cross-sectional view showing the main part of the filter case. A regulator receiving recess 52 in a cylindrical tubular shape opening at a bottom portion and closing at a top portion is formed between the fuel outlet 44 and the fuel discharge passage 49 of the filter case 38. The regulator receiving recess 52 is formed in the cylindrical tubular shape having two stepped portions. A communicating port 53, which communicates with the fuel outlet 44 and the fuel discharge passage 49 are formed on right and left sides of an lower end portion of an upper cylindrical portion 52*a* defining the regulator receiving recess 52. In addition, fuel ejection openings 54 radially (in a front and rear direction of a paper with respect to FIG. 6) passing through the upper cylindrical portion 52*a* at front and rear sides of an upper end portion of the upper cylindrical portion 52*a*.

Figure 7:
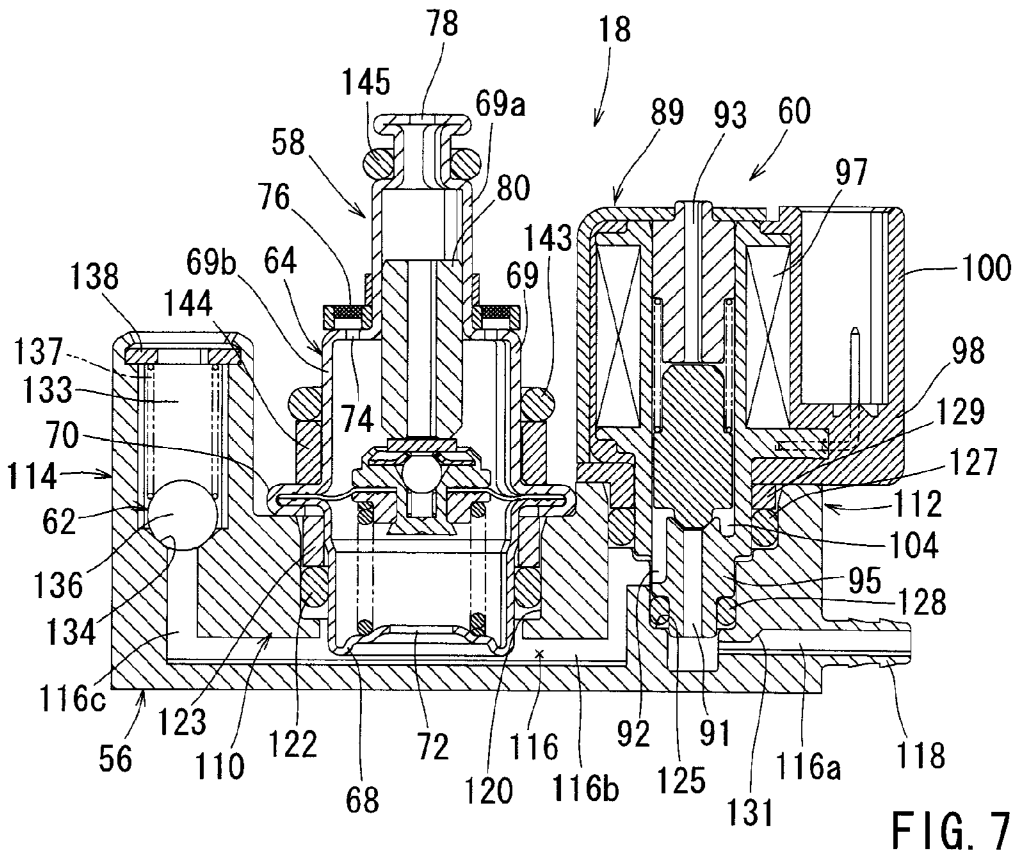
FIG. 7 is a cross-sectional side view of a control pressure regulation unit.

FIG. 7 is a sectional side view of the control pressure regulation unit. As shown in FIG. 7, the control pressure regulation unit 18 has a unit case 56, a pressure regulator 58, a three-way valve 60 and a relief valve 62.

Figure 8:
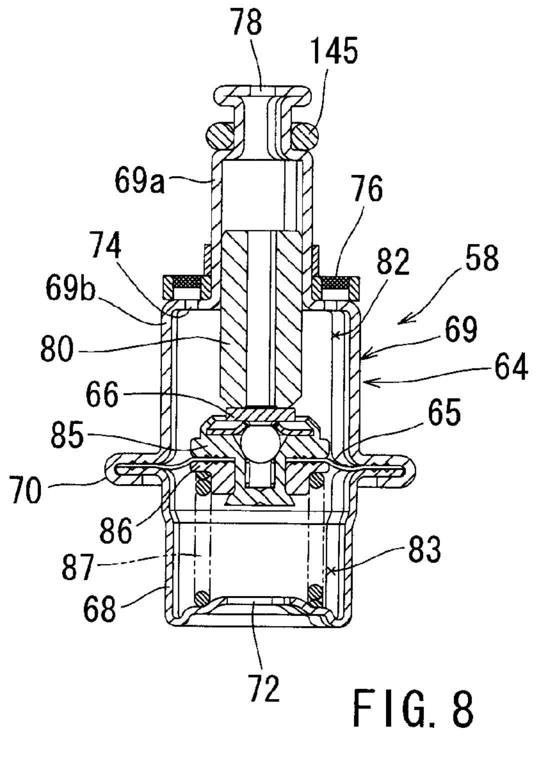
FIG. 8 is a cross-sectional view of a pressure regulator.

FIG. 8 is a cross-sectional view showing the pressure regulator. As shown in FIG. 8, the pressure regulator 58 is composed of a casing 64, a diaphragm 65 and a valve 66. The casing 64 is an outer shell of the pressure regulator 58 and is formed by engaging a case 68, which is positioned at a side of a control pressure chamber (lower side) and is formed in a cylindrical tubular shape opening upwardly and closed at a bottom portion, and a case 69, which is positioned at a side of a pressure regulating chamber (upper side) and is formed in a cylindrical tubular shape opening downwardly and closed at a top portion, due to swaging. Here, a flange 70 protruding from an outer circumferential surface of the casing 64 is formed due to swaging of both cases 68 and 69.

A communicating hole 72 opens at a bottom wall of the case 68 positioned at the side of the control pressure chamber. In addition, the case 69 at the pressure regulating chamber side is formed in a cylindrical shape having two stepped portions. A fuel feed opening 74 is formed in a stepped wall connecting a small diameter cylindrical portion 69*a* and a large diameter cylindrical portion 69*b* of the case 69. A ring-shape filter member 76 to be positioned on the stepped wall is fitted with the small diameter cylindrical portion 69*a* of the case 69. The filter member 76 can filter the fuel discharged from inside of the case 69 through the fuel feed opening 74. In addition, a fuel discharge hole 78 opens in an upper end wall of the case 69. An upper portion of a valve seat 80 in a cylindrical tubular shape is fixed within the small diameter cylindrical portion 69*a* of the case 69 due to press fitting.

The diaphragm 65 is supported from both sides thereof between the cases 68 and 69 and divides an inner space of the casing 64 into the pressure regulating chamber 82 at the upper side and the control pressure chamber 83 at the lower side. The diaphragm 65 is formed from a rubber like elastic material, and thus has flexibility. The diaphragm 65 corresponds to "movable partition" herein. In addition, a central portion of the diaphragm 65 is engaged with a support member 85 at an upper side and a spring receiving portion 86 at a lower side due to swaging.

The valve 66 is movably supported on the support member 85. When the valve 66 moves in an axial direction (vertical direction) due to flexural deformation of the diaphragm, a lower end of the valve seat 80 is opened and closed, so that communication between inside of the valve seat 80 and the pressure regulating chamber 82 can be allowed and blocked. Within the control pressure chamber 83, a valve spring 87 made of a coil spring is disposed between the bottom wall of the case 68 at the side of the control pressure chamber and the spring receiving portion 86. The valve spring 87 is biased in a direction that the valve 66 is seated on the valve seat 86, i.e., valve closing direction.

When a fuel pressure for pressing against the diaphragm 65 in the pressure regulating chamber 82 is lower than a pressing force against the diaphragm 65, that is elastic force of the valve spring 87 in the control pressure chamber 83, the valve 66 is moved upwardly due to the elastic force of the valve spring 87 and is seated on the valve seat 80. When the fuel pressure in the pressure regulating chamber 82 is higher than the elastic force of the valve spring 87, the valve 66 is moved downwardly due to flexural deformation of the diaphragm 65 and is removed away from the valve seat 80. This causes reduction of the fuel pressure in the pressure regulating chamber 82 to a predetermined value. In addition, when the fuel pressure in the pressure regulating chamber 82 reaches the predetermined value, the valve 66 is closed due to the elastic force of the valve spring 87.

Figure 9:
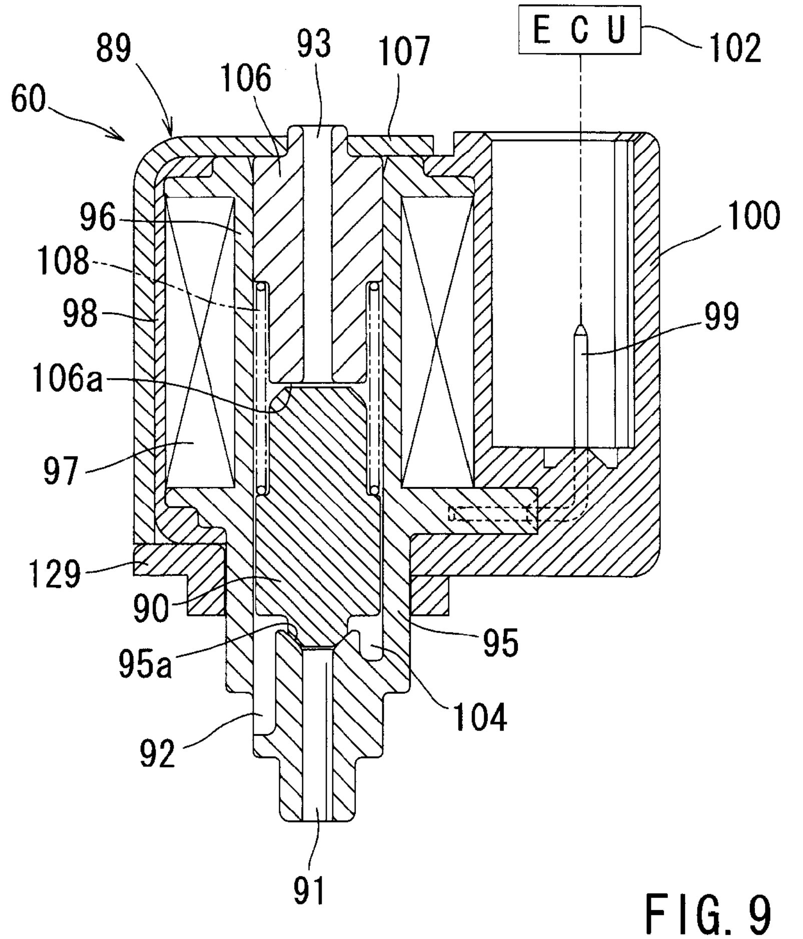
FIG. 9 is a cross-sectional view of a three-way valve.

FIG. 9 is a cross-sectional view showing the three-way valve. As shown in FIG. 9, the three-way valve 60 is an electrically-driven changeover valve and is configured such that communicating states and blocking states of a first port 91, a second port 92 and a third port 93 can be changed by moving a plunger 90 in an axial direction (vertical direction in FIG. 9) due to driving force of a solenoid portion 89. The solenoid portion 89 is configured by winding a solenoid coil 97 around a bobbin portion 96 formed on an upper portion of a valve body in a cylindrical tubular shape. The bobbin portion 96 and the solenoid coil 97 are fitted with a resin portion 98. A connector portion 100 in a socket shape surrounding a terminal 99 connected with the solenoid coil 97 is formed on the resin portion 98. The connector portion 100 is configured to be connected with a power feeding connector in a plug shape (not shown) from above. Power distribution to the solenoid coil 97 is controlled depending on control signals from an electronic control unit (ECU) 102. In addition, the three-way valve 60 corresponds to "changeover valve" herein.

A valve chamber 104 is formed in the valve body 95. The first port 91 and the second port 92 communicating with the valve chamber 104 are formed on a lower end portion. The first port 91 passes through the valve body 95 in the axial direction (vertical direction in FIG. 9) and opens at a lower surface of the valve body 95 and opens into the valve chamber 104. A valve seat 95*a* is formed around an upper opening portion of the first port 91. In addition, the second port 92 extends in the vertical direction and opens at an outer circumferential surface of the valve body 95 and opens into the valve chamber 104.

A cylindrical member 106 in a cylindrical tubular shape is disposed within an upper portion of the bobbin portion 96 of the valve body 95. The cylindrical member 106 is held by a magnetic plate 107 mounted on an upper surface of the valve body 95. The third port 93 is defined by the cylindrical member 106 and passes through the cylindrical member 106 in the axial direction (vertical direction in FIG. 9). A valve seat 106*a* is formed at a lower surface of the cylindrical member 106. For convenience of explanation, the valve seat 106*a* is referred to as "upper valve seat 106*a*", whereas the valve seat 95*a* is referred to as "lower valve seat 95*a*". The plate 107 covers an outer circumferential surface of the resin portion 98. A ring member 129 having magnetic properties and engaged with the valve body 95 is mounted on a lower surface of the resin portion 98. A flange portion of the ring member 129 is attached to a lower portion of the plate 107 due to, for example, welding.

The plunger 90 is disposed in the valve chamber 104 of the valve body 95 so as to slidably move in the axial direction (vertical direction in FIG. 9). In addition, a gap having a predetermined length is configured between an inner circumferential wall of the valve chamber 104 of the valve body 95 and an outer circumferential surface of the plunger 90. The lower valve seat 95*a* and the upper valve seat 106*a* are selectively opened and closed due to vertical movement of the plunger 90. A valve spring 108 made of a coil spring is disposed between the plunger 90 and the cylindrical member 106. The valve spring 108 is biased in a direction that the plunger is seated on the lower valve seat 95*a*.

In the three-way valve 60, when the solenoid coil 97 is not provided with the electric power (in an OFF state), the plunger 90 is pressed downwardly due to elastic force of the valve spring 108. Thus, the plunger 90 is seated on the lower valve seat 95*a*, and the first port 91 is closed. In this state, the plunger 90 is removed away from the upper valve seat 106*a*, so that the third port 93 is opened. Therefore, the second port 92 and the third port 93 communicate with each other via the gap between the inner circumferential surface of the valve chamber 104 of the valve body 95 and the outer circumferential surface of the plunger 90.

When the solenoid coil 97 is provided with the electric power (in an ON state), the plunger 90 is moved upwardly against the elastic force of the valve spring 108 due to magnetic force generated by provision of the electric power. Thus, the plunger 90 is seated on the upper valve seat 106*a*, and the third port 93 is closed. In this state, the plunger 90 is removed away from the lower valve seat 95*a*, so that the first port 91 is opened and communicates with the second port 92.

The ECU 102 is a control unit composed of, for example, microcomputer. An input terminal of the ECU 102 is connected with a detecting device, e.g., a starting switch such as an ignition switch or a start switch of the engine. Whereas, an output terminal of the ECU 102 is connected with the solenoid coil 97 of the three-way valve 60. In addition, the ECU 102 is configured to carry out on-off control of the solenoid coil 97 of the three-way valve 60 depending on operating state of the engine. For example, the ECU 102 is configured to put the solenoid coil 97 in the ON state during a predetermined period after starting process of the engine is started (the starting switch such as the ignition switch or the start switch is turned on), and to put the solenoid coil 97 in the OFF state after the elapse of the predetermined period. The ECU 102 corresponds to "control device" herein.

Figure 10:
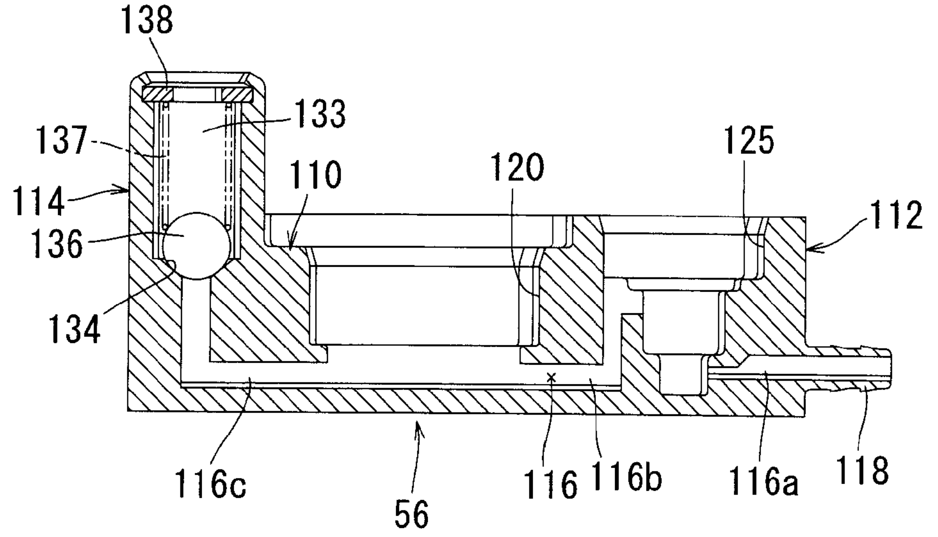
FIG. 10 is a cross-sectional view of a unit case.

FIG. 10 is a cross-sectional view showing the unit case. As shown in FIG. 10, the unit case 56 includes a regulator support portion 110, a three-way valve support portion 112 formed at one side (for example, front side (right side in FIG. 10)) of the regulator support portion 110, and a relief valve support portion 114 formed on another side (for example, rear side (left side in FIG. 10)) of the regulator support portion 110. The support portions 110, 112 and 114 are formed in a line in a front-back direction (right and left direction in FIG. 10), and are close to each other. In addition, a control pressure passage 116 communicating with each of the support portions 110, 112 and 114 is formed in the unit case 56. One end (front end) of the control pressure passage 116 opens into a hose connecting port 118 formed on a front surface (right surface in FIG. 10) of the unit case 56. The other end of the control pressure passage 116 opens upwardly at the relief valve support portion 114. In addition, the unit case 56 corresponds to "passage forming member" herein.

A regulator engaging recess 120 in a cylindrical tubular shape opening upwardly and having a bottom is formed in the regulator support portion 110. The control pressure passage 116 passes through a bottom portion of the regulator engaging recess 120 in the front-back direction (right and left direction in FIG. 10). As shown in FIG. 7, the case 68 at the side of the control pressure chamber of the casing 64 in the pressure regulator 58 (refer to FIG. 8) is fitted within the regulator engaging recess 120 from above. The flange portion 70 of the casing 64 is supported on an upper surface of the regulator support portion 110. The communicating hole 72 of the pressure regulator 58 communicates with the control pressure passage 116. An engaging piece 121 engaging with an outer circumference of a lower cylindrical portion 52*b* defining a regulator receiving recess 52 of the filter case 38 protrudes above the regulator support portion 110 (refer to FIG. 2). An O-ring 122 and a ring-shape member 123 positioned above the O-ring 122 are disposed between an inner circumferential surface of the regulator engaging recess 120 and an outer circumferential surface of the case 68 at the side of the control pressure chamber (refer to FIG. 7). In addition, the case 68 at the control pressure chamber side corresponds to "portion at a control pressure chamber side".

As shown in FIG. 10, a valve engaging recess 125 in a cylindrical tubular shape opening upwardly and having a bottom is formed in the three-way valve support portion 112. The valve engaging recess 125 is formed in a stepped cylindrical tubular shape such that the control pressure passage 116 passes through a bottom portion of the valve engaging recess 125 in the front-back direction (right and left direction in FIG. 10). In particular, a downstream end of an upstream pathway 116*a* of the control pressure passage 116, which communicates with the hose connecting port 118, opens concentrically in a bottom surface of the valve engaging recess 125. Whereas, an upstream end of a downstream pathway 116*b* of the control pressure passage 116, which communicates with the regulator engaging recess 120, opens in the inner circumferential surface of the valve engaging recess 125.

As shown in FIG. 7, a lower portion of the valve body 95 protruding below the ring member 129 of the three-way valve 60 (refer to FIG. 9) is fitted within the valve engaging recess 125 from above. With this, the ring member 129 is supported on an upper surface of the three-way valve support portion 112. The first port 91 of the three-way valve 60 communicates with the upstream pathway 116*a* of the control pressure passage 116. The second port 92 of the three-way valve 60 communicates with the downstream pathway 116*b* of the control pressure passage 116. A pair of O-rings 127 and 128 and a protrusion formed on the ring member 129 are disposed between the inner circumferential surface of the valve engaging recess 125 and the outer circumferential surface of the valve body 95. A constricted portion 131 narrowing a downstream portion of the upstream pathway 116*a* is formed at an intermediate portion of the upstream pathway 116*a* of the control pressure passage 116. The constricted portion 131 limits the amount of the fuel introduced into the control pressure chamber 83 of the pressure regulator 58 through the control pressure passage 116 to a predetermined amount.

As shown in FIG. 10, a valve chamber 133 in a cylindrical tubular shape opening upwardly and having a bottom is formed in the relief valve support portion 114 of the unit case 56. A downstream end of a pathway 116*c* of the control pressure passage, which communicates with the regulator engaging recess 120, opens concentrically at a lower surface of the valve chamber 133. A taper-shape valve seat 134 expanding upwardly is formed at the downstream end of the pathway 116*c*. A spherical valve 136, a spring 137 made of a coil spring and a ring-shape stopper 138 are sequentially provided within the valve chamber from above. The spherical valve 136 can open and close the valve seat 134 due to its vertical movement. The spring 137 biases the spherical valve 136 in a closing direction (downwardly in FIG. 10). The stopper 138 is fixed within an upper opening of the valve chamber 133 due to swaging and supports the spring 137 in a compressed state.

The control pressure regulation unit 18 (refer to FIG. 7) is assembled on the filter case 38 (refer to FIG. 6) of the fuel filter 16 as described below. That is, as shown in FIG. 2, the regulator support portion 110 of the unit case 56 of the control pressure regulation unit 18 is attached to the lower cylindrical portion 52*b* of the regulator receiving recess 52 of the filter case 38 due to snap fitting. Here, such snap fitting is configured by an engaging projection 140 formed on an outer circumferential surface of the lower cylindrical portion 52*b* of the regulator receiving recess 52 of the filter case 38 and an engaged hole 141 formed in the engaging piece 121 of the regulator engaging recess 120, which is engaged with the outer circumferential surface of the lower cylindrical portion 52*b*, and engaged with the engaging projection 140 due to elastic deformation of the engaging piece 121 (refer to FIG. 4).

When the control pressure regulation unit 18 is assembled on the filter case 38, the case 69 at the pressure regulating chamber side of the pressure regulator 58 is fitted within the regulator receiving recess 52 of the filter case 38. Thus, as shown in FIG. 3, the casing 64 of the pressure regulator 58 is supported from both sides thereof between the regulator receiving recess 52 of the filter case 38 and the regulator engaging recess 120 of the regulator support portion 110, and the flange portion 70 of the casing 64 is supported from both sides thereof between the lower cylindrical portion 52*b* of the regulator receiving recess 52 and the regulator support portion 110. In addition, the fuel feed opening 74 of the case 69 at the pressure regulating chamber side of the pressure regulator 58 communicates with the communicating port 53 of the filter case 38 via the filter member 76. The fuel discharge hole 78 of the case 69 at the pressure regulating chamber side communicates with inside of the upper cylindrical portion 52*a* of the regulator receiving recess 52.

As shown in FIG. 4, the hose connecting port 36 of the suction filter 27 and the hose connecting port 118 of the unit case 56 communicate with each other via a fuel feed hose 142. As shown in FIG. 3, an O-ring 143 and a ring member 144 positioned below the O-ring 143 are disposed between the inner circumferential surface of the lower cylindrical portion 52*b* of the regulator receiving recess 52 and an outer circumferential surface of the large diameter cylindrical portion 69*b* of the pressure regulating chamber case 69. An O-ring 145 is disposed between an inner circumferential surface of the upper cylindrical portion 52*a* of the regulator receiving recess 52 and an outer circumferential surface of the small diameter cylindrical portion of the case 69 at the pressure regulating chamber side. The fuel supply system 10 is disposed in the fuel tank 12 because, for example, the filter case 38 is supported on the set plate 20.

Operation of the fuel supply system 10 will be described. In FIG. 1, when the engine starts, the fuel pump 14 works so that the fuel in the fuel tank 12 is suctioned through the suction filter 27, is pressurized due to the fuel pump 14, and then is discharged from the fuel discharge opening 28 (refer to FIG. 5). The pressurized fuel, which has been discharged, is filtered by the filter element 39 of the fuel filter 16 (refer to FIG. 2), and then flows from the fuel outlet 44 of the filter case 38 (refer to FIG. 4) to the communicating port 53 of the regulator receiving recess 52. After that, the pressurized fuel is supplied to the engine, i.e., the injector through the fuel discharge passage 49, the piping member 50, the fuel feeding pipe 21 (refer to FIG. 1) and fuel feeding passage 22, and is injected into a combustion chamber of the engine from the injector. With this, a part of the fuel flowing through the communicating port 53 of the filter case 38 (refer to FIG. 2) is introduced into the pressure regulating chamber 82 through the filter member 76 of the pressure regulator 58 and the fuel feed opening 74 (refer to FIG. 3).

When the solenoid coil 97 of the three-way valve 60 is provided with the electric power due to the control signals from the ECU 102 with starting of engine operation, the first port 91 and the second port 92 communicate with each other, and the third port 93 is blocked. In this state, the fuel discharged from the vapor jet 32 of the fuel pump 14 (refer to FIG. 5), that is partially pressurized fuel, is introduced from the hose connecting port 36 of the suction filter 27 (refer to FIG. 4) into the control pressure passage 116 of the unit case 56 (refer to FIG. 3) through the fuel feed hose 142. When the fuel introduced into the control pressure passage 116 flows into the control pressure chamber 83 of the pressure regulator 58, fuel pressure in the control pressure chamber 83 increases. At this time, the valve 66 of the pressure regulator 58 sits on the valve seat 80, so that fuel pressure in the pressure regulating chamber 82 increases furthermore. When the fuel pressure in the pressure regulating chamber 82 of the pressure regulator 58 becomes higher than that of the control pressure chamber 83, the diaphragm 65 is bent toward the control pressure chamber 83, and the valve 66 is moved away from the valve seat 80. Accordingly, the fuel in the pressure regulating chamber 82 is discharged into the upper cylindrical portion 52*a* of the regulator receiving recess 52 of the filter case 38 through the valve seat 80, the small diameter cylindrical portion 69*a* of the case 69 at the control pressure chamber side, and the fuel discharge hole 78. In addition, the fuel discharged into the upper cylindrical portion 52*a* is ejected into the fuel tank 12 through the fuel ejection opening 54. When the fuel pressure in the pressure regulating chamber 82 decreases, the diaphragm 65 is bent toward the pressure regulating chamber 82, and the valve 66 is seated on the valve seat 80. In this way, the fuel pressure in the pressure regulating chamber 82, that is the fuel pressure supplied to the engine, is adjusted to higher pressure than steady pressure, for example, to about 600 kPa.

As described previously, the fuel pressure supplied to the engine is adjusted to the pressure higher than the steady pressure due to the pressure regulator 58, so that atomization of the fuel injected by the injector can be enhanced, and startability of the engine can be improved. The ON state of the three-way valve 60 is kept during a period from the time that the engine starts (the starting switch such as ignition switch or start switch is turned on) to the time that the predetermined period has been passed after completion of engine starting.

In addition, the pressure of the fuel introduced into the control pressure chamber 83 of the pressure regulator 58 is controlled to a predetermined pressure due to the relief valve 62. That is, when the fuel pressure in the control pressure chamber 83 becomes higher than the elastic force of the spring 137, the spherical valve 136 is moved away from the valve seat 134 against the elastic force of the spring 137, and the fuel in the control pressure chamber 83 is released through the valve chamber 133, so that the fuel pressure in the control pressure chamber 83 decreases to a predetermined pressure. When the fuel pressure in the control pressure chamber 83 reaches a predetermined pressure, the spherical valve 136 is seated on the valve seat 134 due to the elastic force of the spring 137. Accordingly, the fuel pressure in the control pressure chamber 83 of the pressure regulator 58 is controlled to the predetermined pressure.

When the solenoid coil 97 of the three-way valve 60 is not provided with the electric power depending on the control signals from the ECU 102, the first port 91 of the three-way valve 60 is blocked, whereas the second port 92 and the third port 93 communicate with each other. In this state, the fuel in the upper pathway 116*a* of the control pressure passage 116 of the unit case 56 is restricted to flow into the lower pathway 116*b*, i.e., the control pressure chamber 83 of the pressure regulator 58. With this, air is introduced into the control pressure chamber 83, that is, the control pressure chamber 83 is opened to the atmosphere. Therefore, pressure acting on the diaphragm 65 in the control pressure chamber 83 is caused by only the elastic force of the valve spring 87. Accordingly, the fuel pressure in the pressure regulating chamber 82 of the pressure regulator 58, that is, pressure of the fuel supplied to the engine is adjusted to the steady pressure, for example about 400 kPa.

As described previously, the pressure of the fuel supplied to the engine is adjusted to the steady pressure due to the pressure regulator 58 in order to reduce load on, for example, the fuel pump 14. The ON state of the three-way valve 60 corresponds to "high pressure state" herein, and the OFF state of the three-way valve 60 corresponds to "steady pressure state" herein.

With respect to the fuel supply system 10 described previously, the fuel in the fuel tank 12 is suctioned into and pressurized by the fuel pump 14, and then is adjusted to a predetermined pressure by the pressure regulator 58 and supplied to the engine. In addition, the three-way valve 60 is controlled due to the ECU 102, and the fuel and the air are selectively switched for being supplied to the control pressure chamber 83 of the pressure regulator 58, so that the pressure of the fuel supplied to the engine can be altered.

The control pressure passage 116 for feeding the fuel to the control pressure chamber 83 of the pressure regulator 58 and the valve chamber 104 of the three-way valve 60 is formed in a single member for forming passage, that is the unit case 56. Therefore, the number of members and the number of assembly steps as for piping members such as hose or pipe used for the control pressure chamber 83 of the pressure regulator 58 and the three-way valve 60 can be reduced, and piping arrangement can be simplified. Thus, assembly property of the pressure regulator 58 and the three-way valve 60 to the unit case 56 and sealing property according to such assembly can be improved.

The controlled pressure in the control pressure chamber 83 of the pressure regulator 58 is more stabilized compared with a case that piping members such as hose or pipe are used, so that regulation ability of the pressure regulator 58 can be improved. The pressure regulator 58, the three-way valve 60 and the relief valve 62 are disposed in a line in a front-back direction (right and left direction in FIG. 3), so that the control pressure regulation unit 18 and consequently the fuel supply system 10 can be configured more compactly. The pressure regulator 58 and the three-way valve 60 can be located close to each other, so that volume of the fuel passage can be reduced, and the reactivity to pressure can be improved.

The unit case 56 supports the case 68 at the control pressure chamber side of the casing 64 of the pressure regulator 58. In particular, the unit case 56 has a regulator support portion 110 supporting the case 68 at the control pressure chamber side of the casing 64 of the pressure regulator 58. Therefore, the unit case 56 can also work as a member supporting the case 68 at the control pressure chamber side of the pressure regulator 58.

The pressure regulator 58 and the three-way valve 60 are assembled to the unit case 56 from the same direction (from above in FIG. 3). Therefore, assembly property of the pressure regulator 58 and the three-way valve 60 to the unit case 56 can be improved.

The relief valve 62 controlling the fuel pressure in the control pressure chamber 83 of the pressure regulator 58 to a predetermined pressure is provided in the control pressure passage 116 of the unit case 56 (FIG. 3). Accordingly, the fuel pressure in the control pressure chamber 83 of the pressure regulator 58 can be controlled to a predetermined pressure due to the relief valve 62. In addition, the relief valve 62 is provided in the control pressure passage 116 of the unit case 56, so that piping members such as hose or pipe forming the fuel passage to the relief valve 62 can be omitted, and piping arrangement for the fuel passage can be simplified.

The three-way valve 60, the pressure regulator 58 and the relief valve 62 are sequentially disposed in the control pressure passage 116 of the unit case 56 from an upstream side to a downstream side (FIG. 3). Therefore, the fuel flowing in the control pressure passage 116 of the unit case 56 sequentially passes through the three-way valve 60, the pressure regulator 58 and the relief valve 62, and then is discharged from the control pressure passage 116, so that the control pressure passage 116 does not have any dead-end portion. Accordingly, it is able to prevent or reduce stagnation, i.e., accumulation of the fuel in the control pressure passage 116.

Three members, i.e., the pressure regulator 58, the three-way valve 60 and the relief valve 62 are mounted on the unit case 56 from the same direction (from above in FIG. 3). Therefore, assembly property of the pressure regulator 58, the three-way valve 60 and the relief valve 62 to the unit case 56 can be improved. In addition, it is only necessary to configure such that at least two of the pressure regulator 58, the three-way valve 60 and the relief valve 62 are assembled to the unit case 56 from the same direction.

Figure 11:
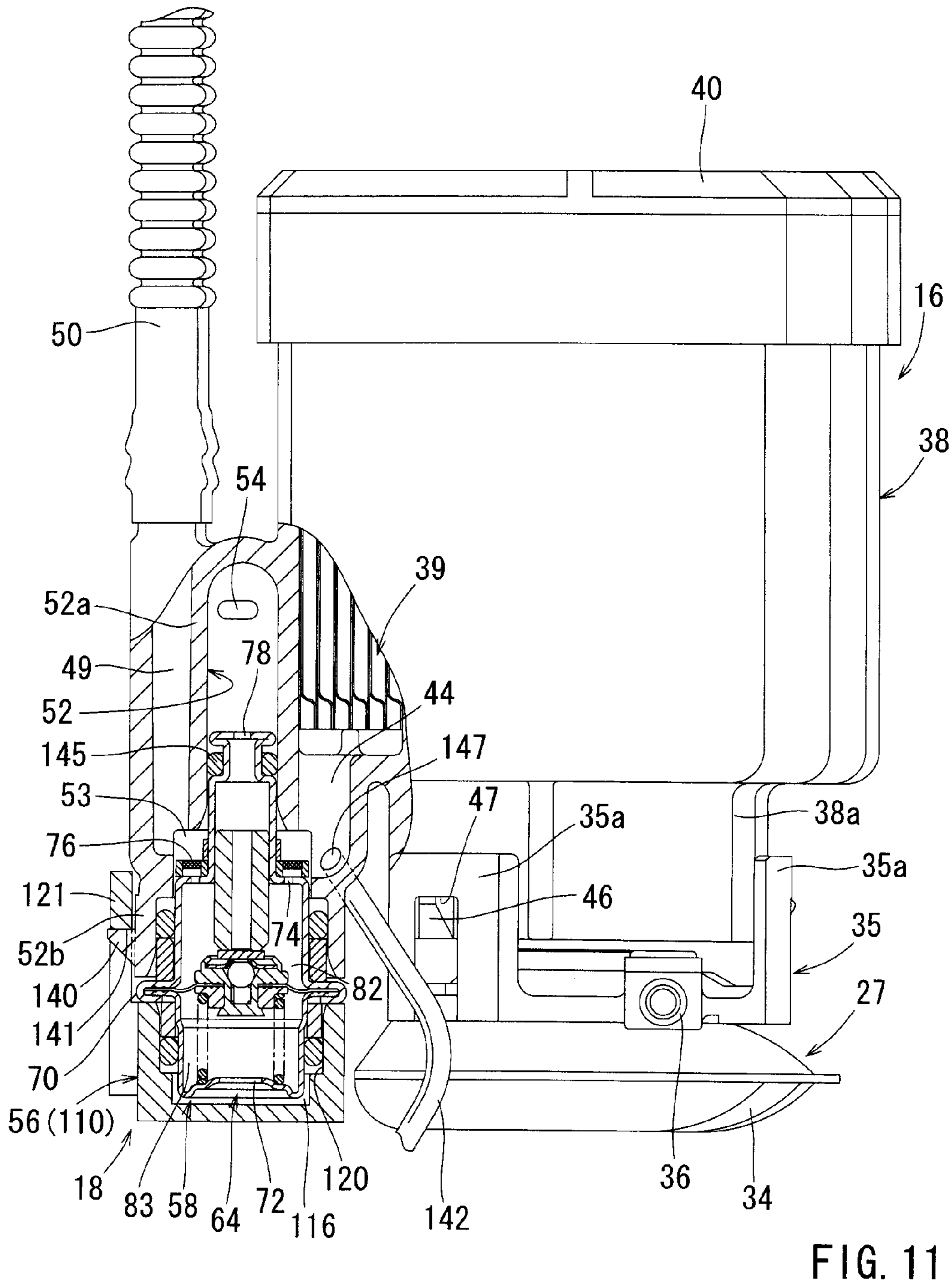
FIG. 11 is a partially sectional front view of a fuel supply system according to another aspect.

Another aspect that is a modified version of the first will be described. Only modified portions will be described, and redundant explanation will be omitted. FIG. 11 is a partially sectional front view of the fuel supply system.

As shown in FIG. 11, in this aspect, an upstream end of the fuel feed hose 142 in the first aspect (refer to FIG. 1) is connected to a hose connecting hole 147 formed in a wall of the pathway between the fuel outlet 44 of the filter case 38 and the communicating port 53 instead of the hose connecting port 36 of the suction filter 27. That is, it is configured that a part of the fuel discharged from the fuel outlet 44 of the filter case 38 (pressurized fuel) is introduced into the control pressure passage 116 of the unit case 56 through the fuel feed hose 142.

Figure 12:
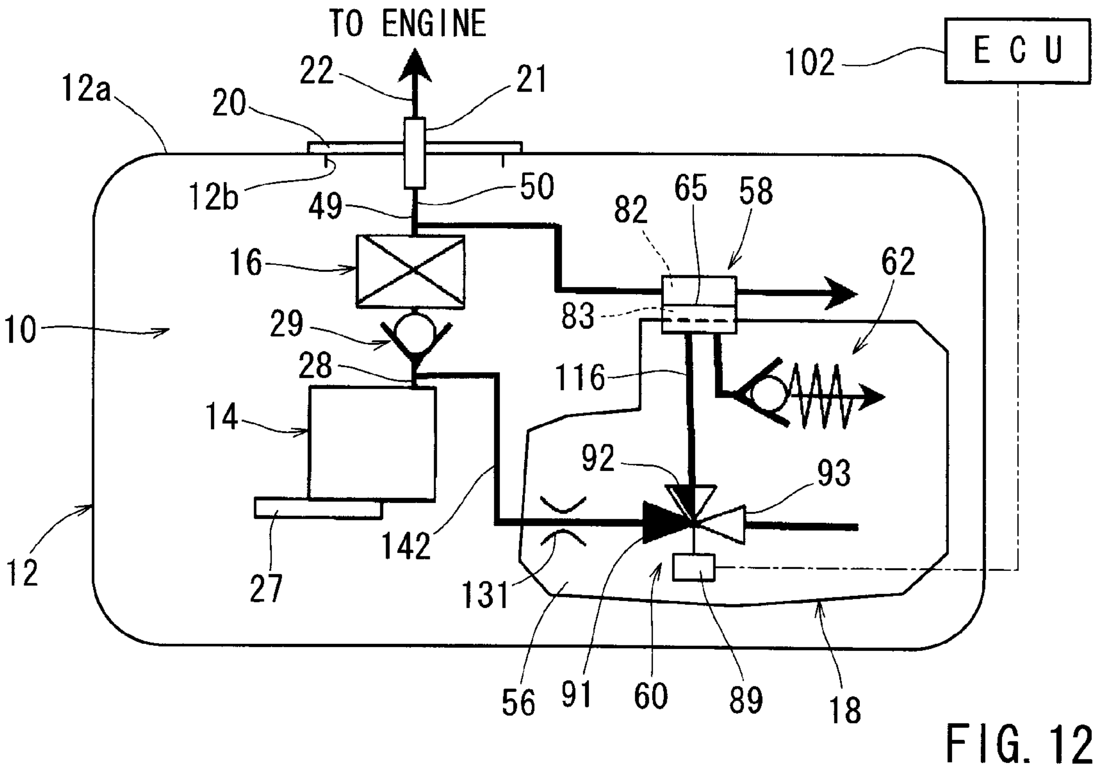
FIG. 12 is a schematic structural view of a fuel supply system according to another aspect.

A aspect will be described. This aspect is a modified version of the first aspect. Only modified portions will be described, and redundant explanation will be omitted. FIG. 12 is a schematic structural view showing the fuel supply system.

As shown in FIG. 12, in this aspect, the upstream end of the fuel feed hose 142 in the first aspect (refer to FIG. 1) is connected to the fuel discharge opening 28 of the fuel pump 14 instead of the hose connecting port 36 of the suction filter 27. That is, it is configured that a part of the fuel discharged from the fuel discharge opening 28 of the fuel pump 14 (pressurized fuel) is introduced into the control pressure passage 116 of the unit case 56.

Figure 13:
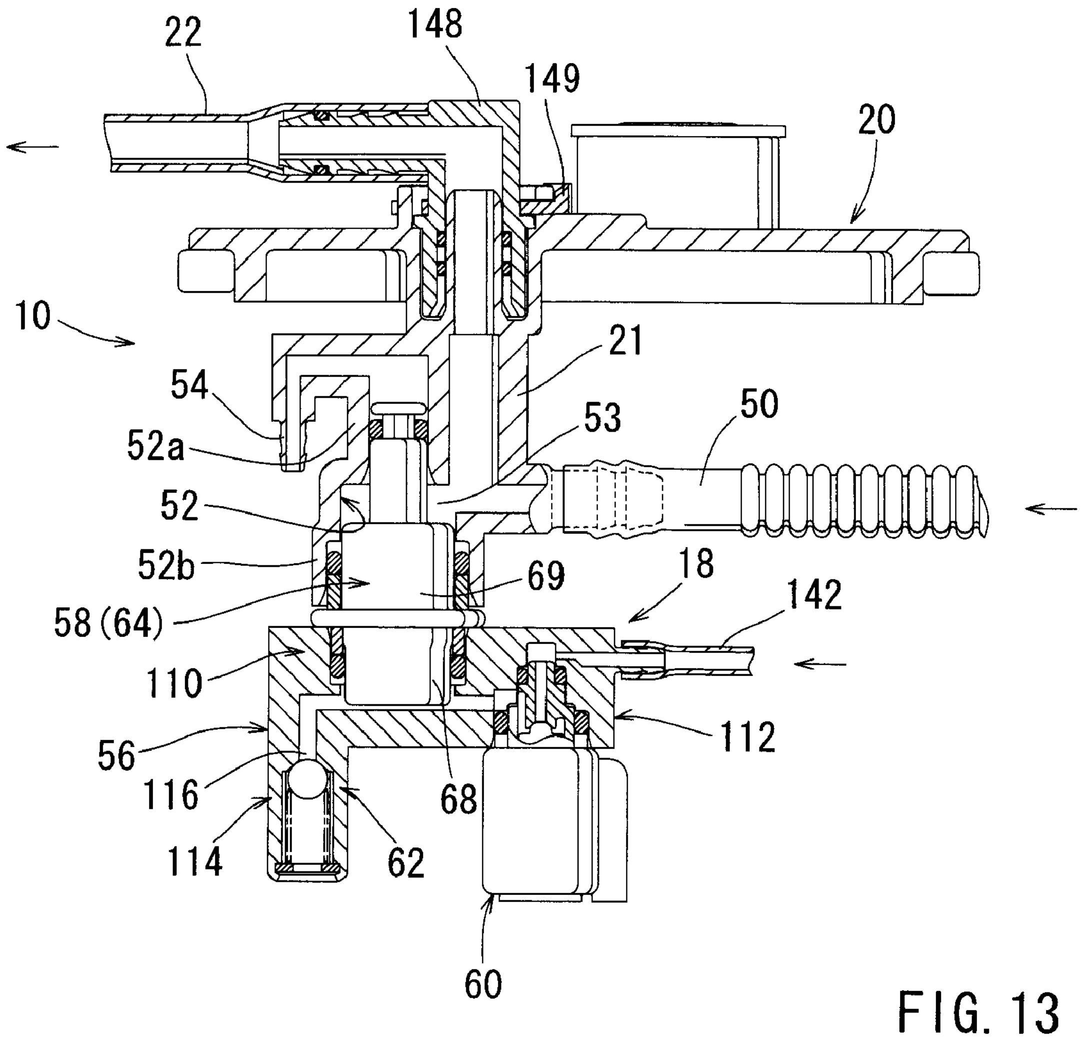
FIG. 13 is a partially sectional front view of a fuel supply system according to another aspect.
Figure 14:
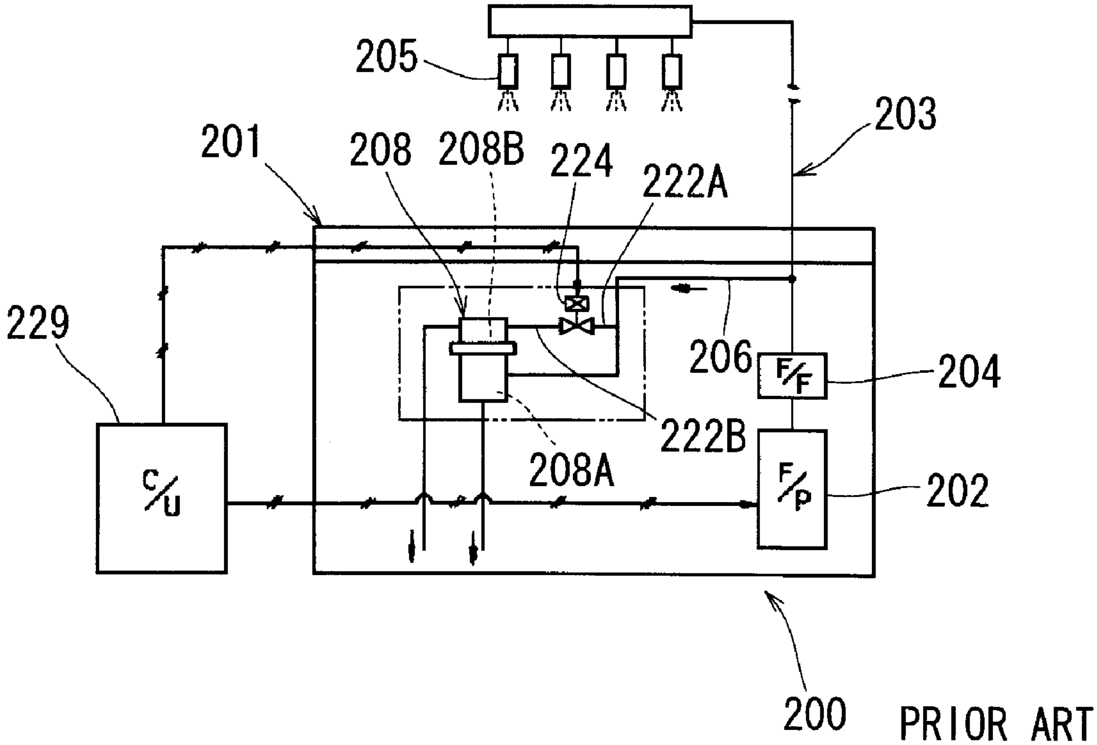
PRIOR ART FIG. 14
FIG. 14 is a schematic structural view of a fuel supply system known in the prior art.

Another aspect will be described. This aspect corresponds to the first aspect partially modified, so that only modified portions will be described, and redundant explanation will be omitted. FIG. 13 is a partially sectional front view showing the fuel supply system.

As shown in FIG. 13, in this aspect, the regulator receiving recess 52 in the first aspect (refer to FIG. 3) is formed in the set plate 20 instead of the filter case 38. In addition, the fuel feeding pipe 21 is formed in an L-shape at a lower surface of the set plate 20. A laterally extending end portion of the fuel feeding pipe 21 is connected with the piping member 50. At an upper surface of the set plate 20, an L-shape feed pipe 148 is rotatably connected to and upper end of the fuel feeding pipe 21 such that the feed pipe 148 is prevented from detaching from the upper end of the fuel feeding pipe 21 due to a clip 149. This feed pipe 148 is connected with the fuel feeding passage 22.

The regulator receiving recess 52 in a cylindrical tubular shape opening at a lower side is formed in one side portion (right side portion in FIG. 13) of the fuel feeding pipe 21. The communicating port 53 of the regulator receiving recess 52 communicates with the fuel feeding pipe 21. In addition, an upper end of the upper cylindrical portion 52*a* of the regulator receiving recess 52 is formed in a reverse U-shape, and its lower end corresponds to the fuel ejection opening 54.

In the unit case 56 of the control pressure regulation unit 18, the three-way valve 112 and the relief valve support portion 114 are configured upside down compared with the first embodiment, and the two members, i.e., three-way valve 60 and the relief valve 62 are assembled to the unit case 56 from the same direction (from below in FIG. 13). Therefore, it is able to improve assembly property of the three-way valve 60 and the relief valve 62 to the unit case 56.

The present invention is not limited to the descriptions above, and can be modified without departing from the spirit and the scope of the invention. For example, the upstream end of the fuel feed hose 142 can be connected to a second fuel discharge opening formed in addition to the fuel discharge opening 28 of the fuel pump 14. In addition, the upstream end of the fuel feed hose 142 can be connected to a second vapor jet formed in addition to the vapor jet 32 of the fuel pump 14. That is, in a case that a part of the pressurized fuel or the partially pressurized fuel due to the fuel pump 14 is introduced into the control pressure chamber 83 of the pressure regulator 58, the fuel can be introduced from any portion of the fuel pump 14.

The invention claimed is:

1. A fuel supply system comprising:

a fuel tank for storing fuel;

a fuel pump supplying the fuel in the fuel tank to an engine;

a pressure regulator having a pressure regulating chamber and a control pressure chamber divided by a movable partition, adjusting fuel pressure in the pressure regulation chamber depending on pressure in the control pressure chamber, and discharging redundant fuel in the pressure regulation chamber, wherein the fuel introduced into the pressure regulation chamber is the pressurized fuel after pressurization due to the fuel pump, and wherein the fuel introduced into the control pressure chamber is the fuel after pressurization or being pressurized due to the fuel pump;

a control device;

a changeover valve disposed in a valve chamber and selectively switching between an introduction of fuel and an introduction of air to the control pressure chamber of the pressure regulator depending on control by the control device; and a passage forming member forming a control pressure passage for feeding the fuel to the control pressure chamber of the pressure regulator and the valve chamber for the changeover valve.

2. The fuel supply system as in claim 1, wherein the passage forming member supports a portion including the control pressure chamber of the pressure regulator.

3. The fuel supply system as in claim 2, wherein the pressure regulator and the changeover valve are assembled to the passage forming member from the same direction.

4. The fuel supply system as in claim 3, further comprising a relief valve controlling the fuel pressure in the control pressure chamber of the pressure regulator to a predetermined pressure and disposed in the control pressure passage.

5. The fuel supply system as in claim 4, wherein the pressure regulator, the changeover valve and the relief valve are sequentially disposed in the control pressure passage from an upstream side to a downstream side.

6. The fuel supply system as in claim 5, wherein at least two of the pressure regulator, the changeover valve and the relief valve are assembled to the passage forming member from the same direction.

* * * * *